(12) United States Patent
Ferguson et al.

(10) Patent No.: US 7,099,352 B1
(45) Date of Patent: Aug. 29, 2006

(54) SYSTEM, APPARATUS, AND METHOD FOR INCREASING RESILIENCY IN COMMUNICATIONS

(75) Inventors: Dennis C. Ferguson, Mountain View, CA (US); Devereaux C. Chen, Cupertino, CA (US); Eric M. Verwillow, Palo Alto, CA (US); Ramesh Padmanabhan, Los Altos, CA (US); Thomas Michael Skibo, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 773 days.

(21) Appl. No.: 09/752,828

(22) Filed: Jan. 3, 2001

(51) Int. Cl.
*H04J 3/06* (2006.01)

(52) U.S. Cl. .................................. 370/504; 370/505
(58) Field of Classification Search ................ 370/503, 370/505, 506, 501
See application file for complete search history.

(56) References Cited

U.S. PATENT DOCUMENTS

| | | | | |
|---|---|---|---|---|
| 4,679,193 | A * | 7/1987 | Jensen et al. ................ | 370/230 |
| 4,922,503 | A * | 5/1990 | Leone ......................... | 370/402 |
| 5,123,014 | A * | 6/1992 | Federkins et al. ........... | 370/522 |
| 5,410,536 | A * | 4/1995 | Shah et al. .................. | 370/216 |
| 5,461,618 | A * | 10/1995 | Chen et al. .................. | 370/470 |
| 5,530,959 | A * | 6/1996 | Amrany ....................... | 380/268 |
| 5,778,189 | A * | 7/1998 | Kimura et al. .............. | 709/236 |
| 5,835,602 | A * | 11/1998 | Lang ........................... | 380/268 |
| 5,845,085 | A * | 12/1998 | Gulick ........................ | 709/236 |
| 5,854,840 | A * | 12/1998 | Cannella, Jr. ............... | 380/268 |
| 6,128,313 | A * | 10/2000 | Chapman et al. ........... | 370/465 |
| 6,188,699 | B1 * | 2/2001 | Lang et al. .................. | 370/463 |
| 6,249,525 | B1 * | 6/2001 | Aggarwal et al. ........... | 370/413 |
| 6,263,443 | B1 * | 7/2001 | Anderson et al. ........... | 726/1 |
| 6,317,236 | B1 * | 11/2001 | Saunders ..................... | 398/98 |
| 6,442,170 | B1 * | 8/2002 | Perlman et al. ............. | 370/401 |

OTHER PUBLICATIONS

W. Simpson; "PPP in HDLC-like Framing;" Jul. 1994; pp. 1-23.
S. Merchant; "PPP over SONET (SDH) at Rates from STS-1 (AU-3) to STS-192c (AU-4-64c/STM-64;" Nov. 1998; pp. 1-14.
D. Ferguson et al.; "Self-Synchronous Scramblers For PPP Over Sonet/SDH: Some Analysis;" Nov. 1997; pp. 1-18.
A. Malis et al.; "PPP over SONET/SDH;" Jun. 1999; pp. 1-9.
J. Manchester et al.; "Enabling Transparency for the PPP over SONET/SDH Mapping;" Nov. 21, 1997; pp. 1-6.

(Continued)

*Primary Examiner*—Ajit Patel
*Assistant Examiner*—Andrew C. Lee
(74) *Attorney, Agent, or Firm*—Harrity Snyder, LLP

(57) ABSTRACT

A transmitting system inserts runt abort packets in an outgoing data stream during idle time inter-frame time fill. The runt abort packets cause the receiving system to synchronize itself to the transmitting system so that even if an error during inter-frame time fill causes the receiving system to go into an erroneous state, the receiving system will be synchronized with the transmitting system before receiving valid data. In one embodiment, the transmitting system transmits data in packets over SONET. The packet data is scrambled at the transmitting end and descrambled at the receiving end. Runt abort packets sent during inter-frame time fill resynchronize the descrambler. If there is an error in the inter-frame time fill bytes, causing the receiving end descrambler to no longer be synchronized with the transmitting end scrambler, the runt abort packets will cause the descrambler to resynchronize state with the transmitting scrambler.

25 Claims, 6 Drawing Sheets

OTHER PUBLICATIONS

J. Carlson et al.; "PPP over Simple Data Link (SDL) Using Raw Lightware Channels With ATM-like Framing;" Jun. 1999; pp. 1-18.

Hewlett-Packard Company; "Packet Over SONET/SDH: An Efficient, Cost-effective Alternative to ATM;" © 1999; pp. 1-4.

J. Carlson et al.; "PPP over Simple Data Link (SDL) using SONET/SDH with ATM-like framing;" May 2000; pp. 1-21.

Optical Networking News and Analysis; "SONET;" © 2000 Phillips Business Information LLC; pp. 1-4.

* cited by examiner

SYSTEM, APPARATUS, AND METHOD FOR INCREASING RESILIENCY IN COMMUNICATIONS

BACKGROUND OF THE INVENTION

A. Field of the Invention

Systems, apparatus, and methods consistent with the present invention relate generally to data communications and, more particularly, to systems, apparatus, and methods for increasing resiliency of data communications.

B. Description of Related Art

Transmitting data reliably in a network requires transmitting and receiving systems to process data in the same way. For example, if the transmitting system scrambles data, the receiving system must descramble the data in the same manner in which it was scrambled. Standards often define how transmitting and receiving systems should process data. The Synchronous Optical NETwork (SONET) standard is one such standard.

SONET was developed for transporting data over optical links. In SONET, data is transmitted in a SONET payload envelope (SPE). SONET is sometimes used to transport other protocols. For example, standards have been developed for transporting Point-to-Point Protocol (PPP) data over SONET. One approach to PPP over SONET is described in a paper entitled "PPP Over SONET (SDH) at Rates From STS-1 (AU-3) TO STS-192c (AU-4-64c/STM-64)," S. Merchant (prepared for the PPP Extensions Working Group, 1998) ("Merchant"), the contents of which are hereby incorporated by reference.

Merchant describes encapsulating data in a frame format similar to the frame format used in the High-level Data Link Control (HDLC) protocol. The HDLC-like frame is then placed in the SPE for transport over SONET. The data is delineated with a 0x7e flag at the beginning of the data and the same flag, 0x7e, at the end of the data. Therefore, 0x7e followed by a data value indicates the start of an HDLC frame, and a data value followed by 0x7e indicates the end of an HDLC frame.

A problem arises, however, if a data byte between the 0x7e flags happens to also equal 0x7e. To solve this problem, the data values are analyzed. Each single byte 0x7e data value is replaced, or "escaped," by the two-byte value 0x7d 0x5e. This operation is referred to as byte expansion because one byte is replaced by two bytes.

On the receiving end, the receiving system passes 0x7e values until a non-0x7e value is received, meaning a data stream has started. When the receiving system encounters the two-byte 0x7d 0x5e sequence in the data, it converts the sequence back to 0x7e. This solves the problem of flag values appearing in the data.

But this raises another problem. How does the receiving end know when 0x7d is data, and when it is the first byte of the sequence 0x7d 0x5e? To solve this problem, the transmitting system also replaces each single byte 0x7d data value by the two-byte sequence 0x7d 0x5d. The receiving system, in addition to converting 0x7d 0x5e in the data back to 0x7e, also converts 0x7d 0x5d back to 0x7d.

Byte expansion solves the problem of flag bytes appearing in the data, but unfortunately raises another. An attacker might use this property to overload a link by sending a long string of 0x7d and/or 0x7e data values. Since these single-byte values are expanded to two bytes, the number of bytes is effectively doubled. This reduces bandwidth on the link by half. Thus, an attacker can reduce the bandwidth by sending through a long string of 0x7d and/or 0x7e data values.

Merchant proposes solving the byte expansion problem by scrambling the data using an HDLC scrambler. Scrambling the data before the data is analyzed for flag values virtually eliminates the possibility of an attacker using byte expansion to halve the bandwidth. Thus, scrambling the values thwarts an attacker sending through all 0x7d's and 0x7e's.

One problem with using an HDLC scrambler, however, is that the receiving end HDLC descrambler might fall out of synchronization with the transmitting end HDLC scrambler. On the transmitting end, the HDLC scrambler only advances when packet data is coming through. Thus, during idle time, the HDLC scrambler is not advancing its state and the transmitting system is sending 0x7e inter-frame time fill bytes in each SPE.

A problem arises, however, when there is an error in one or more of the 0x7e inter-frame time fill bytes. If there is an error in one of the inter-frame time fill bytes, the receiving system interprets the byte as a data value because it no longer has a value of 0x7e. On the receiving end the HDLC descrambler is active only when packet data is being received (e.g., bytes other than 0x7e inter-frame time fill bytes are being received). Thus, when there is an error in one of the inter-frame time fill bytes, the byte appears to not be an inter-frame time fill 0x7e byte, which causes the HDLC descrambler to advance during idle time, when it should not. This causes the receiving end HDLC descrambler to no longer be synchronized with the transmitting end HDLC scrambler because it has advanced based on an error, when it should not advance.

When the next data packet is received at the HDLC descrambler, the packet will not be descrambled correctly because the HDLC descrambler is not in the correct state. Consequently, the packet will be thrown out.

Therefore, there exists a need for systems, apparatus, and methods that maintain a link between two systems even when there are bit errors during slow transmission periods.

SUMMARY OF THE INVENTION

Systems, apparatus, and methods consistent with the present invention address this and other needs by replacing inter-frame time fill bytes with synchronization packets at the transmitting end. When each synchronization packet is received at the receiving end, the elements at the receiving end are resynchronized to the elements at the transmitting end. More particularly, systems, apparatus, and methods consistent with the present invention insert at the transmitting end runt abort packets during inter-frame time fill. The runt abort packets synchronize the descrambler at the receiving end with the transmitting end scrambler.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. The following detailed description does not limit the invention. Instead, the scope of the invention is defined by the appended claims and equivalents of the claim limitations.

Systems, apparatus, and methods consistent with the present invention insert information during idle time inter-frame time fill that refreshes a descrambler at the receiving end, thus preventing bit errors during inter-frame time fill from placing the descrambler in an erroneous state. In one embodiment, runt abort packets are inserted during inter-frame time fill and the receiving system flushes a descrambler upon receiving each runt abort packet.

Figure 1:
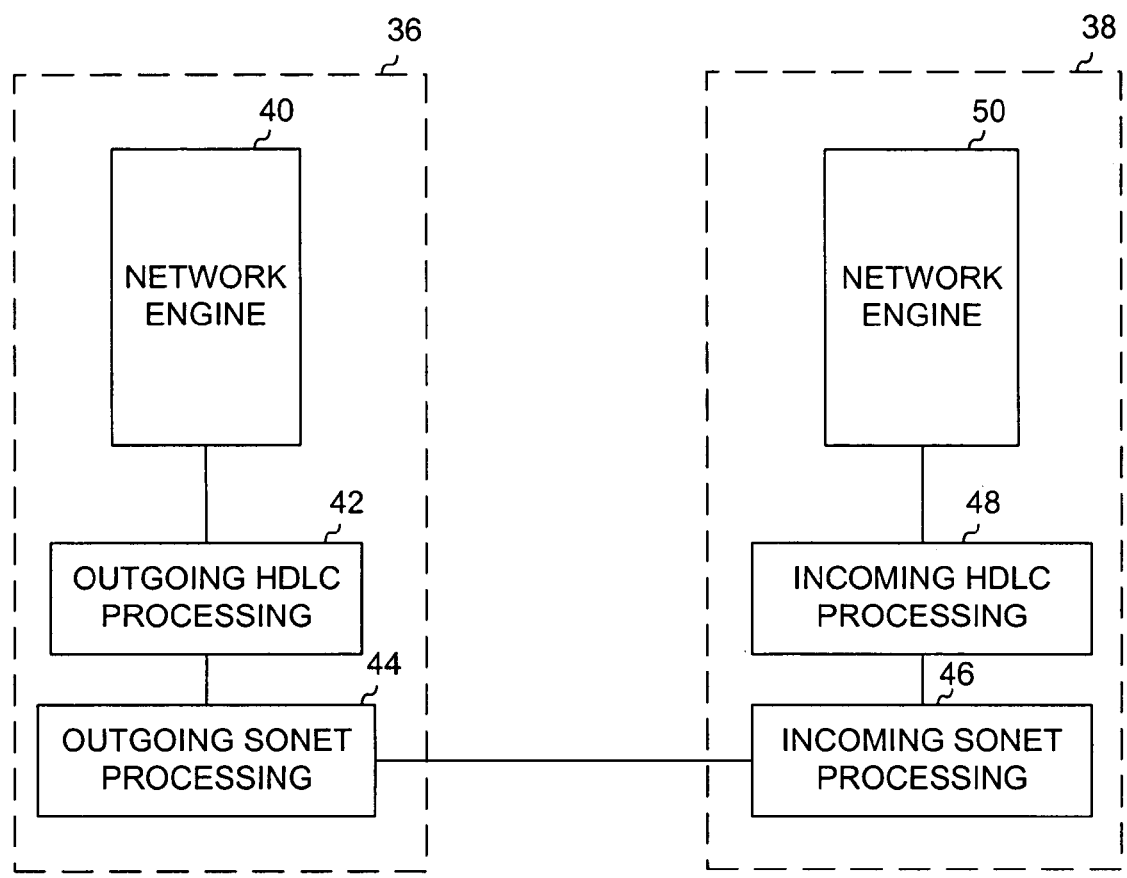
FIG. 1 is a block diagram of two network elements consistent with the principles of the invention.

FIG. 1 is a block diagram of two network elements. In this embodiment, network element 36 transmits packets over SONET to network element 38. Network elements 36 and 38 are shown in simplified form for purposes of illustration and explaining the principles of the invention. In one embodiment, each of network elements 36 and 38 includes elements for transmitting and receiving data over a variety of media using a variety of protocols. In one embodiment, network elements 36 and 38 are routers, each having elements for transmitting data over and receiving data from many types of media using many types of protocols.

Network element 36 comprises network engine 40, outgoing HDLC processing element 42, and outgoing SONET processing element 44. Network element 38 comprises incoming SONET processing element 46, and incoming HDLC processing element 48, and network engine 50. In one embodiment, network elements 36 and 38 route packets and are connected to other network elements, networks, and processing systems.

In one embodiment, network elements 36 and 38 transfer data using packets over SONET (POS) by framing packet data in an HDLC-like format. One example of POS is described in "PPP in HDLC-like Framing," RFC-1662, W. Simpson, editor, prepared for the Network Working Group, 1994 ("Simpson"), which is hereby expressly incorporated herein by reference.

Outgoing HDLC processing element 42 receives packet data from network engine 40 and performs HDLC processing on the packet data. Outgoing HDLC processing element 42, in addition to performing operations consistent with principles of the invention, also performs operations similar to conventional HDLC processing elements, such as frame check sequence (FCS) operations and scrambling data.

Consistent with the principles of the present invention, outgoing HDLC processing element 42 inserts runt abort packets between inter-frame time fill bytes during inter-frame time fill. The runt abort packets are preferably short. In one embodiment, the runt abort packets are less than six bytes long and may comprise, for example, a series of characters, such as "J," "N," "P," "R," "!."

Each runt abort packet includes an indicator that the receiving end should abort the packet. In one embodiment, the abort byte sequence at the end of the packet is 0x7d 0x7e.

After HDLC processing by outgoing HDLC processing element 42, the data is transferred to outgoing SONET processing element 44, which performs SONET processing on the HDLC frames. For example, outgoing SONET processing element 44 scrambles the HDLC frames, loads them into a SONET payload envelope (SPE), and prepares the SONET frame for transport. The SONET frame is then output to another network element, such as network element 38.

Incoming SONET processing element 46 receives the SONET frames, pulls out the HDLC frames from the SPEs, and sends them to incoming HDLC processing element 48. Incoming SONET processing element 46 performs conventional SONET processing operations corresponding to the SONET processing operations on the transmit side. For example, the SONET payload is descrambled by incoming processing element 46, and the payload data is removed from the SPE.

Incoming HDLC processing element 48 receives the HDLC frames and pulls the packet data out of the frames. Incoming HDLC processing element 48 performs many operations corresponding to the HDLC processing operations on the transmit side. For example, the HDLC frame is descrambled by incoming HDLC processing element 48.

When a runt abort packet is received by incoming HDLC processing element 48, the runt abort packet is run through a HDLC descrambler of incoming HDLC processing element 48, thus synchronizing the HDLC descrambler to the HDLC scrambler of outgoing HDLC processing element 42 at the transmit end. The runt abort packet is discarded because it is too short.

During inter-frame time fill, the transmitting end sends out alternating runt abort packets and individual 0x7e inter-frame time fill bytes. In an alternative embodiment, runt abort packets are inserted between several inter-frame time fill bytes. If there is a bit error in a 0x7e inter-frame time fill byte, causing the HDLC descrambler to lose state, the next runt abort packet will flush the HDLC descrambler, placing it back in a correct state, synchronized with the transmit side HDLC scrambler. Thus, even if errors occur in inter-frame time fill bytes, the HDLC descrambler at the receiving end stays synchronized with the HDLC scrambler at the transmitting end.

This solves the problem of conventional systems, which discard the next packet after a bit error in the 0x7e inter-frame time fill bytes. Conventional systems only transmit 0x7e bytes during inter-frame time fill. If one of these bytes has an error, it is interpreted as a non-inter-frame time fill byte, causing the HDLC descrambler to advance during inter-frame time fill, when it should not advance. The HDLC descrambler should only advance when there is packet data. Because a bit error causes the descrambler to advance incorrectly during inter-frame time fill, a conventional system will not descramble the next packet correctly, and the packet will be discarded even though the packet may be valid.

Figure 2:
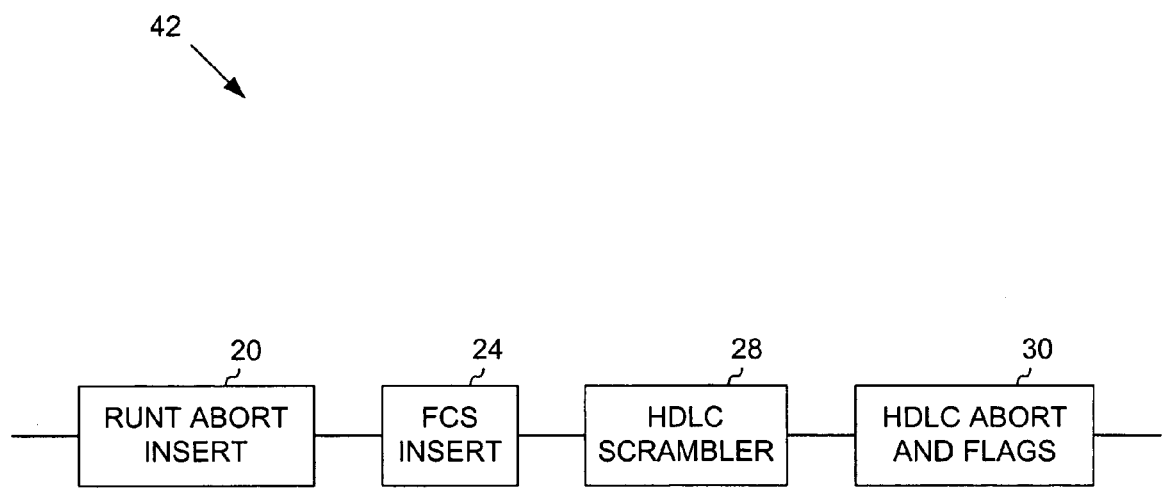
FIG. 2 is a block diagram of a transmitting system for inserting runt abort packets during inter-frame time fill, consistent with the principles of the invention.

FIG. 2 is a block diagram of a transmitting system for inserting runt abort packets during inter-frame time fill, consistent with the principles of the invention. More particularly, outgoing HDLC processing element 42 comprises runt abort insert 20, FCS insert 24, HDLC scrambler 28, HDLC abort and flags 30. Data to be transmitted is fed to runt abort insert 20 from a queue (not shown). If there is data in the queue, runt abort insert 20 forwards the data to FCS insert 24.

During idle time the queue is empty. Since there is no data in the queue, runt abort insert 20 forwards an alternating sequence of inter-frame time fill bytes (0x7e) and runt abort packets to FCS insert 24. Each runt abort packet is preferably less than six bytes long and is marked with an indicator that it should be aborted at the receiving end.

In one embodiment, a random number generator is used to generate the runt abort data bytes. This adds randomness to the scrambler state. If there were ever a problem in which packet data was not sufficiently random to ensure a random scrambler state, this would solve that problem.

FCS insert 24 receives packet data, runt packets, or inter-frame time fill bytes from runt abort insert 20. If packet data or a runt packet are received, FCS insert 24 runs a frame check sequence over the bytes, appends the FCS result, and forwards the bytes and FCS result to HDLC scrambler 28. Inter-frame time fill bytes are simply forwarded to HDLC scrambler 28.

HDLC scrambler 28 only runs on packet data, not when 0x7e inter-frame time fill bytes are received. Therefore, HDLC scrambler 28 scrambles both the data that comes from the queue through runt abort insert 20, as well as the runt abort packets created by runt abort insert 20. In one embodiment, HDLC scrambler 28 is an $x^{29}+1$ self-synchronous scrambler.

HDLC scrambler 28 scrambles the bits and forwards the scrambled bits to HDLC abort and flags 30. HDLC abort and flags 30 adds 0x7e flags to the beginning and end of the scrambled information to form an HDLC frame. If a packet was marked by runt abort insert 20 as a runt abort packet, HDLC abort and flags 30 appends a special two-byte character, 0x7d 0x7e at the end of the scrambled bytes. This two-byte character indicates to the receiving end that the packet should be aborted. Finally, HDLC abort and flags 30 forwards the HDLC frames to outgoing SONET processing element 44 for SONET processing. SONET processing element 44 performs conventional SONET processing on the HDLC frames and inter-frame time fill bytes.

Figure 3:
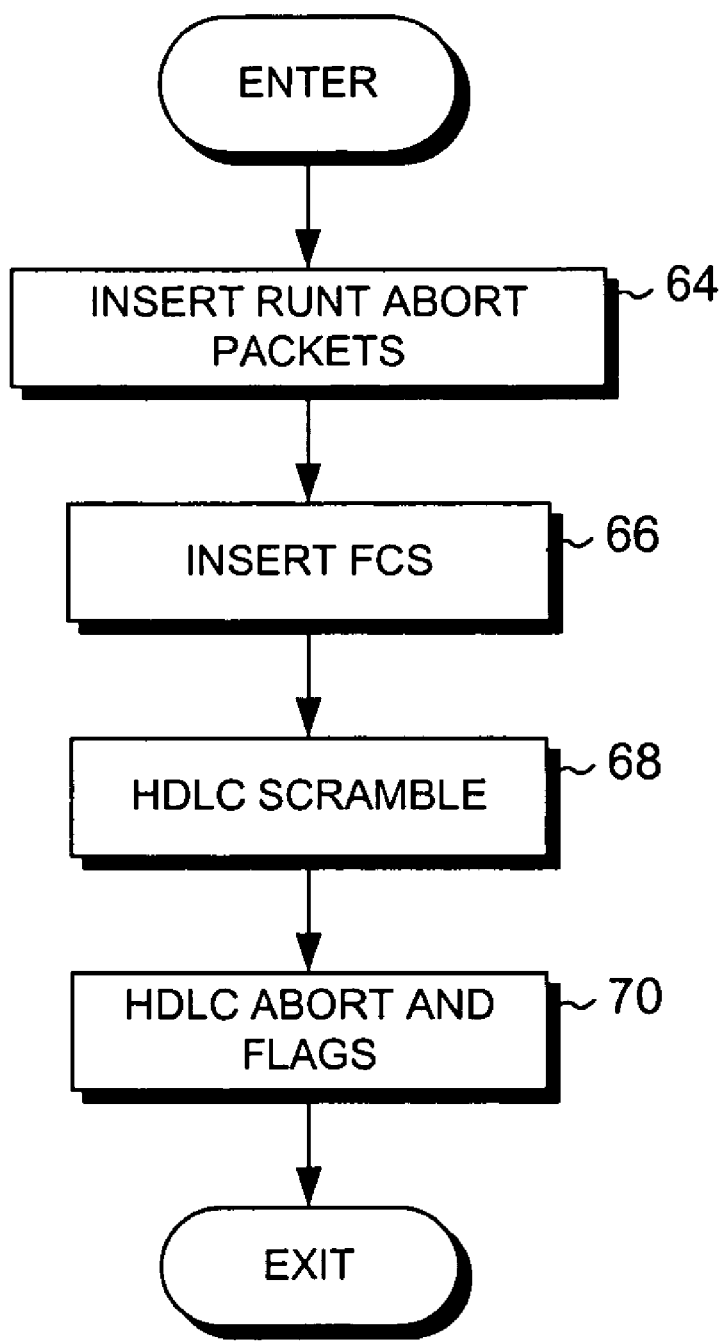
FIG. 3 is a flow chart illustrating the process performed by outgoing HDLC processing element 42, consistent with the principles of the invention.

FIG. 3 is a flow chart illustrating the process performed by outgoing HDLC processing element 42. Outgoing HDLC processing element inserts runt abort packets during inter-frame time fill (step 64), calculates and inserts a frame check sequence based on packet bytes (step 66), scrambles the packet bytes (step 68), and marks runt abort packets and encapsulates the packet bytes with flags to form HDLC frames (step 70). Each of the steps is described in greater detail in the description of FIG. 2.

Figure 4:
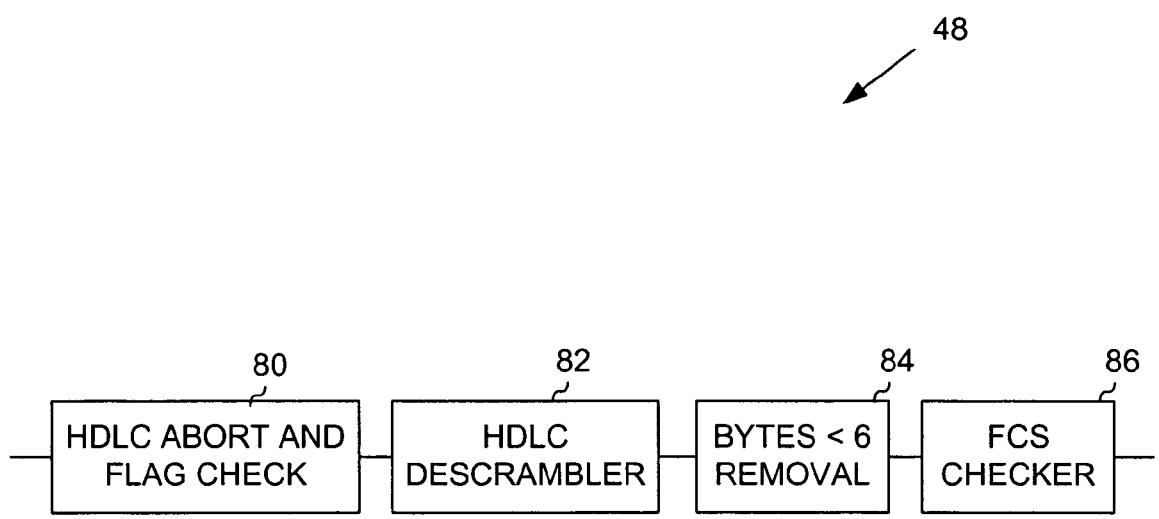
FIG. 4 is a block diagram illustrating incoming HDLC processing element 48, consistent with the principles of the invention.

FIG. 4 is a block diagram illustrating an embodiment of incoming HDLC processing element 48. Incoming HDLC processing element 48 operates on data received from incoming SONET processing element 46. HDLC processing element 48 comprises HDLC abort and flag check 80, HDLC descrambler 82, bytes <6 removal 84, and FCS checker 86.

HDLC abort and flag check 80 analyzes the incoming bytes for start of frame, end of frame, and abort sequences. 0x7e values, indicating inter-frame time fill, are discarded until a non-0x7e value is received, indicating data. Data bytes are forwarded to HDLC descrambler 82.

HDLC abort and flag check 80 checks the incoming bytes to determine whether a 0x7d 0x7e abort sequence has been added to a packet, indicating the packet should be aborted. All runt abort packets include this byte sequence. HDLC abort and flag check 80 forwards non-inter-frame time fill packet data to HDLC descrambler 82. In one embodiment, HDLC descrambler 82 is an $x^{29}+1$ self-synchronous descrambler. HDLC descrambler 82 descrambles the data and forwards the descrambled data to bytes <6 removal 84.

Bytes <6 removal 84 discards packets having a byte length less than six bytes long. Thus, all runt abort packets are discarded at this point. Packets six bytes or longer are forwarded by bytes <6 removal 84 to FCS checker 86, which performs FCS operations on the packet and checks the results against the FCS information appended to the packet.

Figure 5:
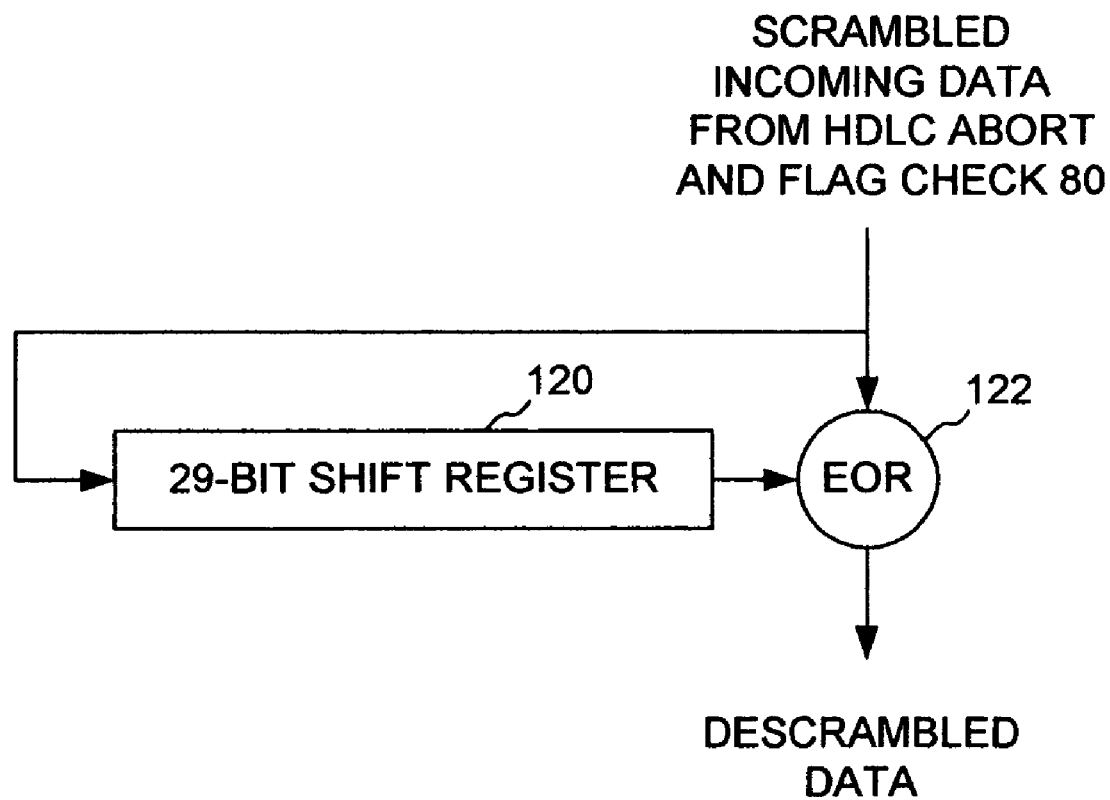
FIG. 5 is a block diagram showing an embodiment of an HDLC descrambler consistent with the principles of the invention.

FIG. 5 is a block diagram showing an embodiment of descrambling elements of HDLC descrambler 82 consistent with the principles of the invention. More particularly, FIG. 5 shows a particular arrangement of elements for descrambling bits that may be used in HDLC descrambler 82. HDLC descrambler 82 may also include other elements for processing the incoming bits.

The descrambling elements comprise 29-bit shift register 120 connected to exclusive-OR element 122. Scrambled bits from the transmitting end are input to exclusive-OR element 122 and the input of 29-bit shift register 120. Exclusive-OR element 122 logically exclusive-ORs the incoming scrambled bits with the output of 29-bit shift register 120, and outputs descrambled data. This operation is the reverse of the scrambling operation performed at the HDLC scrambler at the transmitting end.

29-bit shift register 120 is flushed out by every 29 bits of incoming scrambled data. An error in the bits of scrambled inter-frame time fill bytes causes the shift register to go out of synchronization with the transmitting end scrambler. The next runt abort packet, however, resynchronizes 29-bit shift register 120 by flushing any errors out of the shift register. Even though the runt abort packet will not be descrambled correctly when there is an error in 29-bit shift register 120, the runt abort packet will place the shift register in a correct state. Subsequent scrambled data will be descrambled correctly. This minimizes the impact that errors in inter-frame time fill bytes have on descrambling data.

Figure 6:
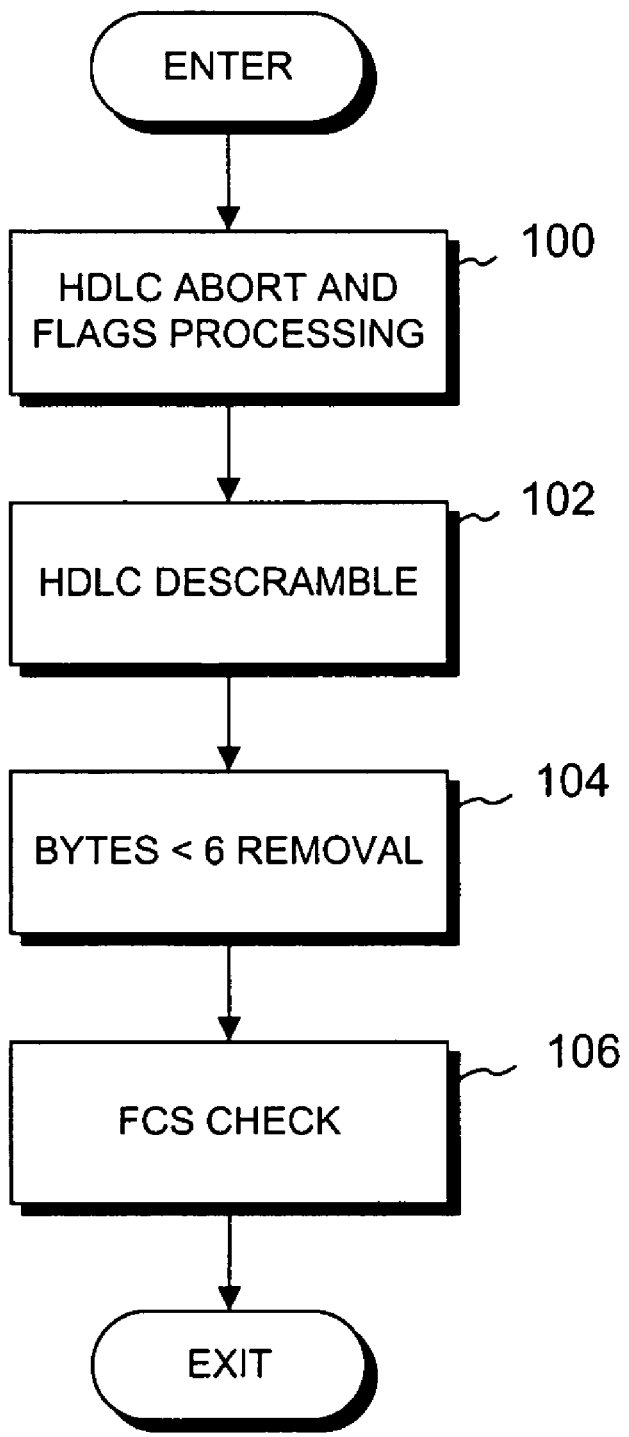
FIG. 6 is a flow chart illustrating the processing performed by incoming HDLC processing element 46, consistent with the principles of the invention.

FIG. 6 is a flow chart illustrating the processing performed by incoming HDLC processing element 48. Incoming HDLC processing element 48 first checks the incoming data for abort and flag information (step 100), descrambles the data (step 102), removes packets having a byte length less than six bytes (step 104), and performs FCS checking operations on the data (step 106). Each of the steps is described in greater detail in the description of FIG. 4.

CONCLUSION

Systems, apparatus, and methods consistent with the principles of the invention insert runt abort packets at a transmitting system during inter-frame time fill to minimize the impact of a bit error during inter-frame time fill. At a receiving system, the runt abort packets flush a descrambler. Flushing the descrambler removes any false advances of the descrambler that might have resulted from a bit error in an inter-frame time fill byte.

The foregoing description provides illustration and description, but is not exhaustive. The invention is not limited to the precise form disclosed. Modifications and variations are possible in light of the above teachings or may be acquired from practice of the invention. The scope of the invention is defined by the claims and equivalents of the claim limitations.

What is claimed is:

1. A method of processing data in a data transmitting system, comprising:
    forwarding data for further processing in the data transmitting system when data is being received;
    generating idle time synchronizing information including at least a runt abort packet during idle time when data is not being received, the idle time synchronizing information for synchronizing a data receiving system with the data transmitting system; and
    generating packet information by processing the data and the idle time synchronizing information in accordance with a packet protocol.

2. The method of claim 1, wherein the runt abort packet includes:
    a packet having a length of less than six bytes.

3. The method of claim 2, wherein the runt abort packet includes:
    a runt abort packet having an abort byte sequence at an end of the runt abort packet.

4. The method of claim 1, further including:
    loading idle time indication information into a data format consistent with the packet protocol.

5. The method of claim 4, further including:
    alternately forwarding the idle time synchronization information and idle time indication information.

6. The method of claim 1, wherein the generating packet information includes:
    scrambling the idle time synchronizing information.

7. The method of claim 1, further including:
    creating network information by processing the packet information in accordance with a transport protocol; and
    forwarding the network information to a data receiving system.

8. The method of claim 7, wherein the creating network information includes:
    scrambling the packet information.

9. Apparatus for processing data in a data transmitting system, comprising:
    a data element for forwarding data for further processing in the data transmitting system when data is being received and creating idle time synchronizing information during idle time when data is not being received, the idle time synchronizing information for synchronizing a data receiving system with the data transmitting system and placing the data receiving system in a correct state with respect to whether an inter-frame time fill byte or a data byte is being received,
    wherein the idle time synchronizing information includes an alternating sequence of runt abort packets and idle time indication bytes; and
    a packet processing element for creating packet information by processing the data and the idle time synchronizing information in accordance with a packet protocol.

10. The apparatus of claim 9, wherein the runt abort packets have a length less than six bytes.

11. The apparatus of claim 9, wherein the packet processing element comprises:
    a scrambler for scrambling the idle time synchronizing information.

12. The apparatus of claim 9, further comprising:
    a network processing element for creating network information by processing the packet information in accordance with a transport protocol; and
    a data transmission element for forwarding the network information to the data receiving system.

13. The apparatus of claim 12, wherein the network processing element comprises:
    a scrambler for scrambling the packet information.

14. A method for receiving data at a data receiving system, comprising:
    receiving an idle time synchronizing packet that was generated by a transmitting system during idle time at the transmitting system;
    determining that the idle time synchronizing packet includes a runt abort packet; and
    synchronizing the data receiving system with the transmitting system by processing the idle time synchronizing packet, the processing the idle time synchronizing packet causing the data receiving system to be in a correct state with respect to whether an inter-frame time fill byte or a data byte is being received.

15. The method of claim 14, further including:
    discarding the idle time synchronizing packet from network transport information if it is determined that the idle time synchronizing packet includes a runt abort packet.

16. A method for synchronizing a transmitting system with a receiving system, comprising:
    forwarding data from the transmitting system to the receiving system when the data is being received by the transmitting system;
    creating a runt abort packet during idle time when the transmitting system is not receiving data, wherein the runt abort packet has a length of less than six bytes;
    forwarding the runt abort packet to the receiving system; and
    processing the runt abort packet at the receiving system to synchronize the receiving system with the transmitting system, wherein:
    the processing the abort packet further comprises:
        causing the receiving system to be placed in a correct state with respect to whether an inter-frame fill byte or a data byte is being received.

17. The method of claim 16, wherein the processing the runt abort packet includes:
    descrambling the runt abort packet.

18. The method of claim 16, further including:
    processing an incoming data stream in accordance with a network protocol; and
    further processing the incoming data stream in accordance with a packet protocol.

19. A system for synchronizing a transmitting system with a receiving system, comprising:
    a data element for forwarding data from the transmitting system to the receiving system when data is being received by the transmitting system and for creating idle time synchronizing packets during idle time when the transmitting system is not receiving data, wherein the idle time synchronizing packets include at least one runt abort packet;
    a forwarding element for forwarding the idle time synchronization packet to the receiving system; and
    a receiver processing element for processing the idle time synchronization packet at the receiving system to synchronize the receiving system with the transmitting system, the receiver processing element being configured to place the receiving system in a correct state with respect to whether an inter-frame time fill byte or a data byte is being received.

20. The system of claim 19, wherein the idle time synchronizing packets include an alternating sequence of runt abort packets and idle time indication bytes.

21. The system of claim 19, wherein the runt abort packet is configured to include an abort packet byte sequence.

22. The system of claim 19, wherein the receiver processing element comprises:
 a descrambler for descrambling the idle time synchronization packet.

23. The system of claim 19, further including:
 a network protocol processing element for processing an incoming data stream in accordance with a network protocol; and
 a packet protocol processing element for further processing the incoming data stream in accordance with a packet protocol.

24. The system of claim 19, wherein the receiver processing element includes:
 a runt abort packet determining element for determining the idle time synchronization packet is a runt abort packet and discarding the runt abort packet.

25. A method for receiving data at a data receiving system, comprising:
 receiving a synchronizing packet generated by a data transmitting system;
 determining whether the synchronizing packet includes a runt abort packet;
 synchronizing the data receiving system with the data transmitting system; and
 setting a state of the data receiving system to a correct state with respect to whether an inter-frame time fill byte or a data byte is being received when the determining determines that the idle time synchronizing packet includes a runt abort packet.

* * * * *